United States Patent
McKay, Jr.

[11] Patent Number: 6,127,014
[45] Date of Patent: Oct. 3, 2000

[54] ADHESIVE ROLLER CONSTRUCTION

[75] Inventor: Nicholas D. McKay, Jr., Birmingham, Mich.

[73] Assignee: Helmac Products Corporation, Flint, Mich.

[21] Appl. No.: 09/174,214

[22] Filed: Oct. 16, 1998

[51] Int. Cl.[7] .................................................. A47L 25/00
[52] U.S. Cl. ................... 428/43; 15/104.002; 428/343; 428/906
[58] Field of Search ....................... 428/42.3, 43.343, 428/906; 15/104.002

[56] References Cited

U.S. PATENT DOCUMENTS

| | | |
|---|---|---|
| 4,237,223 | 12/1980 | Metz . |
| 4,406,912 | 9/1983 | Downing . |
| 4,905,337 | 3/1990 | McKay . |
| 5,027,465 | 7/1991 | McKay . |
| 5,388,300 | 2/1995 | Hickey . |
| 5,616,387 | 4/1997 | Augst . |
| 5,763,038 | 6/1998 | Wood ........................................ 428/43 |
| 5,878,457 | 3/1999 | Cox . |

*Primary Examiner*—Jenna Davis
*Attorney, Agent, or Firm*—Gifford, Krass, Groh, Sprinkle, Anderson & Citkowski, P.C.

[57] ABSTRACT

An adhesive roller construction particularly suited for a lint roller is disclosed having an elongated strip with a backing layer and an adhesive layer overlying one side of the backing strip. The strip is wound onto a tubular cylindrical roll or onto a spindle. A plurality of perforation lines extends between the sides of the strip at predetermined longitudinal intervals therealong so that the perforations define a plurality of longitudinally adjacent sheets along the strip with each sheet overlying one sheet and extending substantially one revolution around the roll. The predetermined intervals are selected such that each sheet is semi-randomly longer than, shorter than, or the same size as its underlying sheet within predefined limits.

6 Claims, 1 Drawing Sheet

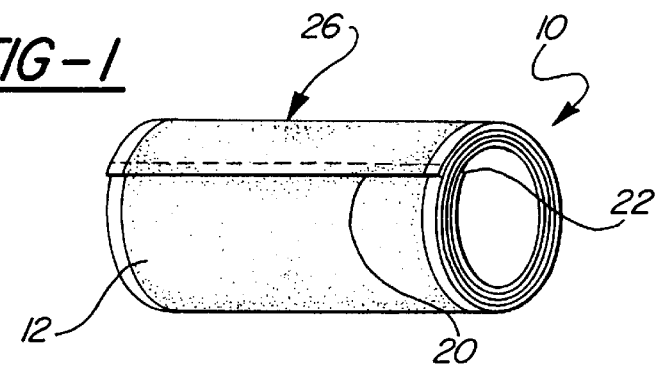
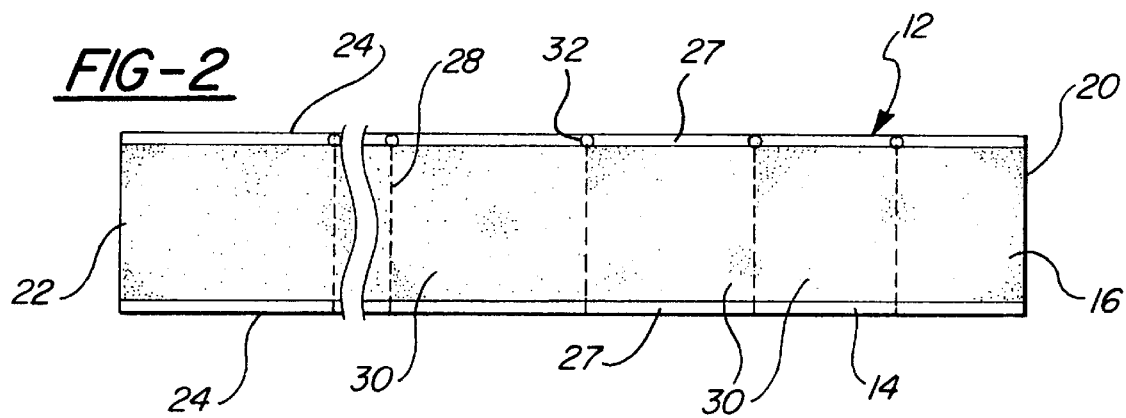
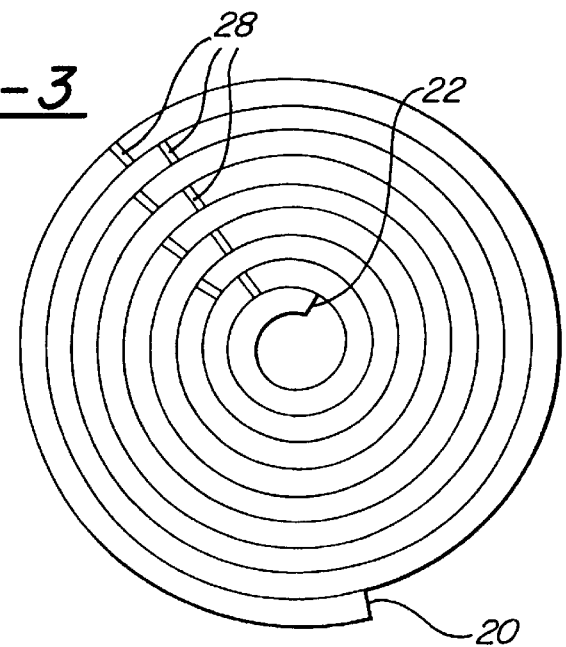

ADHESIVE ROLLER CONSTRUCTION

BACKGROUND OF THE INVENTION

I. Field of the Invention

The present invention relates generally to adhesive rollers and, more particularly, to such a roller used for lint removal.

II. Description of the Prior Art

Lint rollers have been long known and widely used for removing foreign particles, such as pet hair, from clothing. These previously known lint rollers typically comprise a handle having a tubular and cylindrical tape roll rotatably mounted to the handle.

Many previously known adhesive rolls for lint removal consist of a continuous strip having a backing with an adhesive provided on one side of the backing. As the adhesive becomes depleted from use, a portion of the strip is torn from the roll to expose fresh adhesive. This process continues until the entire roll has been depleted at which time a new roll is mounted onto the handle.

One disadvantage of the previously known lint roll having a continuous strip is that it is very difficult, if not altogether impossible, for the user to accurately remove a portion of the used strip equal to one revolution of the adhesive roll. Removal of more than one revolution of the strip from the adhesive roll results in waste of the adhesive roll since the excess strip removed is never used. Conversely, the removal of a strip substantially less than one full revolution of the adhesive roll results in used adhesive being left on the roll after the portion of the strip has been removed. The used adhesive, if a significant portion of the exposed portion of the roll, results in unsatisfactory lint or debris removal for the adhesive roll.

In order to provide a more uniform removal of a portion of the strip amounting to one revolution of the adhesive roll, it has been previously known to provide perforations across the strip at spaced intervals along the adhesive strip corresponding substantially to one full revolution of the adhesive strip on the roll. However, it has been found that if the perforations are spaced along the strip so that the perforations directly overlie each other, this can create a hump in the roll which interferes with the desired smooth rolling action of the adhesive roll on the handle.

One previously known construction to overcome this problem is disclosed in U.S. Pat. No. 5,763,038 to Wood. In the Wood patent, each sheet on the adhesive roll is longer than its underlying sheet by a preset overlap amount. Thus, with the Wood construction, the perforations are not aligned with each other thus eliminating the potential hump on the adhesive roll. However, since each sheet is longer than its underlying sheet by the overlap amount, each sheet necessarily extends more than one revolution around the roll. Consequently, the removal of each sheet on the Wood adhesive roll represents wastage, i.e. an unused adhesive portion of the roll, equal to the overlap amount for each sheet. Thus, fewer sheets can be provided on a strip of the same length than if the overlap portion is removed.

BRIEF SUMMARY OF THE PRESENT INVENTION

The present invention provides an adhesive roller construction which is particularly well suited for a lint roller and which overcomes all of the above-mentioned disadvantages of the previously known devices.

In brief, the present invention comprises an elongated strip having a backing layer and an adhesive layer overlying one side of the backing strip. The strip is wound into a tubular cylindrical roll.

A plurality of perforation lines extends between the sides of the strip at predetermined longitudinal intervals thereaolong so that the perforations define a plurality of longitudinally adjacent sheets along the strip. Each sheet extends substantially one revolution around the roll and overlaps one underlying sheet.

The predetermined intervals between the perforation lines defining the individual sheets are selected so that each sheet is semi-randomly longer than, shorter than or the same size as its underlying sheet within predetermined limits, e.g. less than one-half of an inch. Thus, since the perforation lines are not aligned, the previously known problem of a hump on the roll is eliminated. However, since the perforation lines are semi-randomly arranged so that the average size of the sheet substantially equals one full revolution around the roll, the previously known problem of wastage is eliminated. Furthermore, although the sheets that are somewhat shorter than their underlying sheets necessarily result in an adhesive portion remaining exposed on the roll even after removal of the sheet, this portion is sufficiently small so that it does not adversely affect the overall operation of the lint roller.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 represents an elevational view illustrating a preferred embodiment of the present invention;

FIG. 2 is a plan view of a portion of the adhesive roll in an unwound condition; and FIG. 3 is a diagrammatic cross-sectional view of the preferred embodiment of the invention in a wound condition with exaggerated dimensions for clarity.

DETAILED DESCRIPTION OF A PREFERRED EMBODIMENT OF THE PRESENT INVENTION

With reference first to FIGS. 1 and 2, a preferred embodiment of the adhesive roller construction 10 of the present invention is there shown and comprises an elongated strip 12. The strip 12, illustrated in FIG. 2 in an unwound condition, includes an elongated backing 14 and an adhesive layer 16 overlapping at least a portion of one side of the backing 14.

Still referring to FIGS. 1 and 2, the strip 12 includes a first end 20, a second end 22 and two spaced apart and parallel sides 24. In use, the strip 12 is wound into a tubular and cylindrical roll 26 as illustrated in FIG. 1 and is particularly well suited for use as a lint removal adhesive roll.

As illustrated in FIG. 2, the strip 12 includes two dry edges 27, i.e. edges that are not coated with an adhesive, on opposite sides of the strip 12. Alternatively, however, the strip 12 may include only one dry edge 22 or no dry edges at all.

With reference now to FIG. 2, a plurality of perforation lines 28 extends between the sides 24 of the strip 12 and longitudinally spaced intervals therealong. The perforation lines 28 also preferably extend entirely between the sides 24 of the strip 12 although, if desired, the perforation lines 28 may stop short of the sides 24 of the strip 12. The perforation lines 28 thus divide the strip 12 into a plurality of longitudinally adjacent sheets 30.

The spacing between the perforation lines 28 is arranged on the strip 12 so that each sheet extends substantially one full revolution around the roll 26. The actual length between adjacent perforation lines 28, however, is varied not only to accommodate the increase in diameter of the adhesive roll 26 from its inner end to its outer end 20, but also so that each sheet 30 is semi-randomly longer than, shorter than or equal to its underlying sheet as best shown in FIG. 3 in which the thickness of the step 12 is exaggerated for clarity. The average spacing between the perforation lines 28, however, is equal to substantially one revolution of the adhesive roll 26.

The staggering of the spacing between the perforation lines 28 such that some sheets slightly overlap their underlying sheet while other sheets underlap their underlying sheet effectively eliminates a hump on the roller which can occur from the alignment of the perforation lines 28 with each other. However, since the average size of the sheet is equal to one revolution of the adhesive roll 26, wastage of the strip due to overlapping sheets, as in the prior art, is eliminated. Furthermore, any underlap of the sheet is sufficiently minor, i.e. preferably less than one-half of an inch, such that there is little, if any, degradation of performance of the adhesive roll.

In order to facilitate the rapid location of the perforation lines 28 by the user, preferably an ink or dye mark 32 (collectively called a dye mark) is provided at the perforation line 28 on one or both sides 24 (only one side illustrated). The dye mark optionally is provided along the entire length of the perforation line 28.

Having described my invention, it can be seen that the present invention provides an adhesive roll particularly suited for use as a lint roller which is not only effective in operation, but minimizes waste of the adhesive roll. Having described my invention, however, many modifications thereto will become apparent to those skilled in the art to which it pertains without deviation from the spirit of the invention as defined by the scope of the appended claims.

I claim:

1. An adhesive roller construction comprising:

an elongated strip, said strip having a backing layer and an adhesive layer overlying one side of said backing strip, said strip having a first end, a second end and two spaced apart sides, said strip being wound from said first end to said second end into a tubular cylindrical roll, a plurality of perforation lines extending between said sides of said strip at predetermined longitudinal intervals therealong so that said perforations define a plurality of longitudinally adjacent sheets along said strip, each sheet overlying one sheet and extending substantially one revolution around the roll, said predetermined intervals being selected such that each sheet is semi-randomly longer than, shorter than or the same size of its underlying sheet within predefined limits.

2. The invention as defined in claim 1 wherein said preset limit is less than one-half of one inch.

3. The invention as defined in claim 1 wherein the number of sheets longer than their respective underlying sheets is substantially the same as the number of sheets shorter than their respective underlying sheets.

4. The invention as defined in claim 1 wherein the adhesive roller construction is a lint removal roller.

5. The invention as defined in claim 1 wherein each perforation line extends substantially entirely between said sides of said strip.

6. The invention as defined in claim 1 and comprising a dye mark on at least one end of each perforation line.

* * * * *